(12) United States Patent
Vanderland et al.

(10) Patent No.: US 12,340,380 B2
(45) Date of Patent: Jun. 24, 2025

(54) FORENSICS SYSTEM (71) Applicant: Enverus, Inc., Austin, TX (US)

(72) Inventors: William Sidney Vanderland, Austin, TX (US); William Anderson, Austin, TX (US); Justin Lee Shivers, Austin, TX (US)

(73) Assignee: Enverus, Inc., Austin, TX (US)

( * ) Notice: Subject to any disclaimer, the term of this patent is extended or adjusted under 35 U.S.C. 154(b) by 486 days.

(21) Appl. No.: 17/626,267

(22) PCT Filed: Jul. 10, 2020

(86) PCT No.: PCT/US2020/041581
§ 371 (c)(1),
(2) Date: Jan. 11, 2022

(87) PCT Pub. No.: WO2021/007507
PCT Pub. Date: Jan. 14, 2021

(65) Prior Publication Data
US 2022/0277316 A1    Sep. 1, 2022

(51) Int. Cl.
*G06Q 30/00*    (2023.01)
*G06Q 30/018*    (2023.01)
*G06Q 30/04*    (2012.01)
*G06Q 40/12*    (2023.01)

(52) U.S. Cl.
CPC ......... *G06Q 30/0185* (2013.01); *G06Q 30/04* (2013.01); *G06Q 40/125* (2013.12)

(58) Field of Classification Search
CPC ... G06Q 30/0185; G06Q 40/125; G06Q 30/04
See application file for complete search history.

(56) References Cited

U.S. PATENT DOCUMENTS 9,742,614 B2    8/2017    Chikirivao et al.
2004/0039577 A1    2/2004    Roan et al.
(Continued)

FOREIGN PATENT DOCUMENTS

JP    2015/225550    12/2015

OTHER PUBLICATIONS

International Preliminary Report on Patentability for International Appln. No. PCT/US2020/041581, dated Jan. 20, 2022, 7 pages.
(Continued)

*Primary Examiner* — Rokib Masud
(74) *Attorney, Agent, or Firm* — Fish & Richardson P.C.

(57) ABSTRACT

A method includes receiving ticket and invoice data. The method further includes comparing the ticket and invoice data to rules to identify anomalies. The method further includes generating a graphical user interface displaying information related to the anomalies and selectable options to assign the anomalies to user accounts. The method further includes, in response to receiving a selection of an option to assign a particular anomaly to a user account, storing data assigning the particular anomaly to the user account. The method further includes, in response to receiving a request to access the user account, generating a graphical user interface displaying information related to the particular anomaly.

21 Claims, 5 Drawing Sheets

| | | Anomaly Dashboard | | | | | | | |
|---|---|---|---|---|---|---|---|---|---|
| | Vendor | Anomalies | | | Statistics | | | | |
| ID | Name | New | Open | Closed | Recovered | Flagged Ticket $ | Unique Tickets with Anomalies | Total Tickets | Flagged % |
| 1 | ABC Inc. | 38 | 38 | 0 | $0.00 | $3,790.00 | 13 | 74 | 17.57% |
| 2 | XYZ | 13 | 25 | 1 | $2,000.00 | $400,000 | 17 | 215 | 7.91% |

(56) References Cited

U.S. PATENT DOCUMENTS

2013/0179312 A1\* 7/2013 Al-Hilali ................ G06Q 30/04
                                                    705/30
2013/0198049 A1\* 8/2013 Burns ................ G06Q 10/1091
                                                    705/32

OTHER PUBLICATIONS

International Search Report and Written Opinion for International Appln. No. PCT/US2020/041581, dated Nov. 6, 2020, 10 pages.

\* cited by examiner

FORENSICS SYSTEM

CROSS-REFERENCE TO RELATED APPLICATIONS

This application is a National Stage Application under 35 U.S.C. § 371 and claims the benefit of International Application No. PCT/US2020/041581, filed on Jul. 10, 2020, which claims priority to U.S. Provisional Patent Application Ser. No. 62/873,072, filed on Jul. 11, 2019, the entire contents of which is incorporated herein by reference.

TECHNICAL FIELD

This disclosure relates to forensics systems.

BACKGROUND

Companies often rely on external vendors for services. Such services are often managed using an electronic ticketing system. For example, in the oil and gas industry, a company may request a vendor haul material from one location to another. Once work associated with such request is completed, the vendor creates an electronic work ticket and submits to the company for approval. Upon company's approval of the work ticket, the vendor submits an invoice to the company requesting payment for services rendered. The company then makes payment to the vendor based on the invoice.

Unfortunately, whether due to unscrupulous individuals or human error, some invoices request more money than is owed to the vendor who submits the invoice. For example, the invoice may charge for 30 hours of work when only 3 hours of work were actually performed. Accordingly, a company that relies on third party vendors may end up losing money by paying more than is owed to the third party vendors.

BRIEF DESCRIPTION OF THE DRAWINGS

For the purpose of illustration, there are shown in the drawings certain embodiments described in the present disclosure. In the drawings, like numerals indicate like elements throughout. It should be understood that the full scope of the inventions disclosed herein are not limited to the precise arrangements, dimensions, and instruments shown. In the drawings.

DETAILED DESCRIPTION

In the drawings and the description of the drawings herein, certain terminology is used for convenience only and is not to be taken as limiting the embodiments of the present disclosure. In the drawings and the description below, like numerals indicate like elements throughout.

Systems and methods for automatically analyzing ticketing and invoice data to identify anomalies are disclosed. The disclosed systems and methods compare the ticketing and invoice data to rules to identify the anomalies. The identified anomalies are displayed to an administrator who may then assign the anomalies to forensics user accounts for analysis. The forensics user accounts may input notes indicating steps taken to resolve the anomalies.

Figure 1:
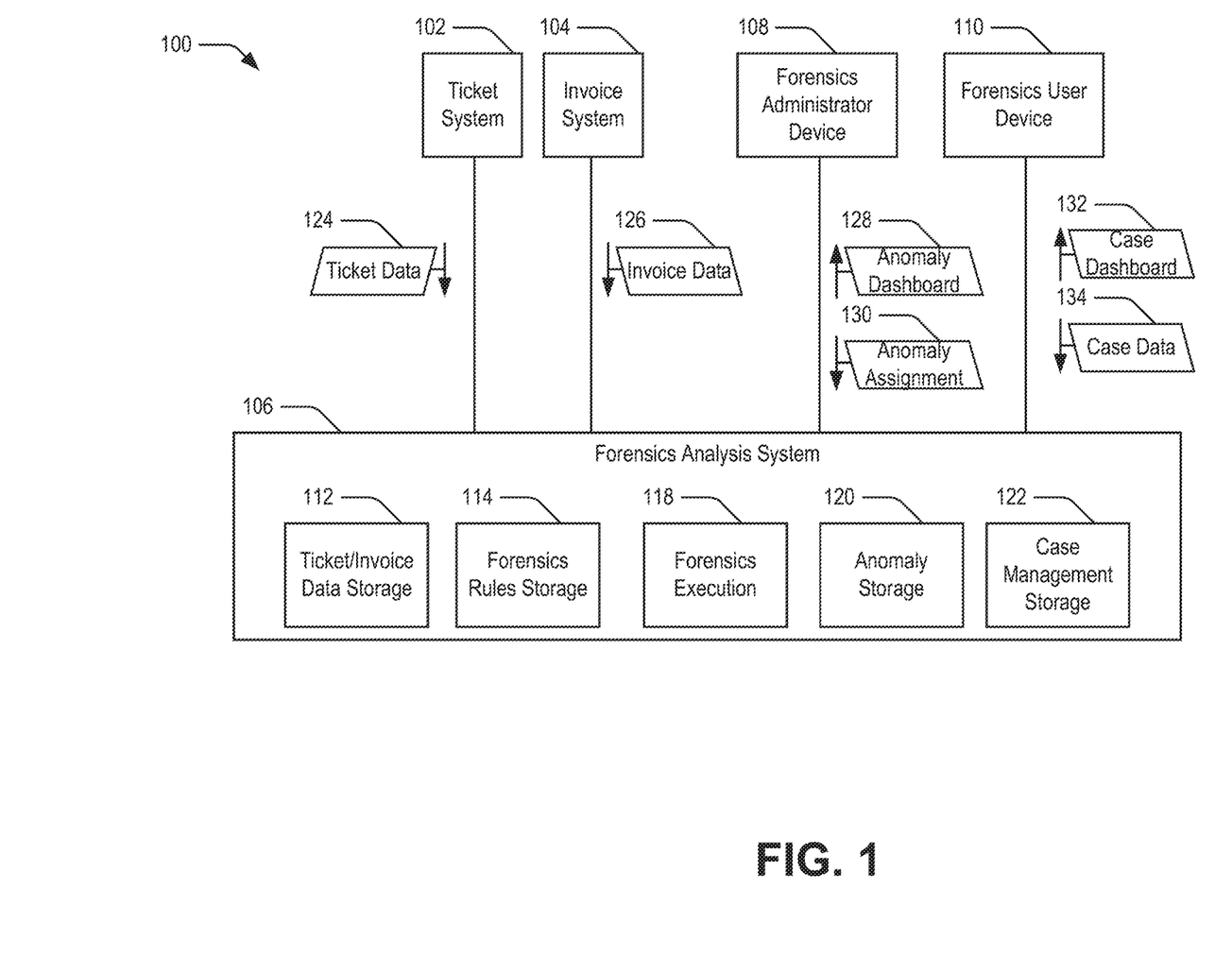
FIG. 1 illustrates a system 100 for analyzing ticketing and invoice data to identify anomalies.

Referring to FIG. 1, a system 100 for analyzing ticketing and invoice data to identify anomalies is shown. The system 100 includes a ticket system 102, an invoice system 104, a forensics analysis system 106, a forensics administrator device 108, and a forensics user device 110. Each of the ticket system 102, the invoice system 104, the forensics analysis system 106, the forensics administrator device 108, and the forensics user device 110 includes one or more computing devices (e.g., a server computer, a desktop computer, a laptop computer, etc.) that includes a processor and memory. One or more of the ticket system 102, the invoice system 104, and the forensics analysis system 106 may correspond to cloud-based computing services (e.g., Amazon Web Services®, Azure®, etc. (Amazon Web Services is a registered trademark of Amazon Technologies, Inc. of Seattle, Washington and Azure is a registered trademark of Microsoft Corporation of Redmond, Washington)). In some implementations, two or more of the ticket system 102, the invoice system 104 and the forensics analysis system 106 are implemented by the same one or more cloud-based computing services and/or computing devices. Similarly, the forensics administrator device 108 and the forensics user device 110 may correspond to a single computing device.

In the illustrated example, the ticket system 102, the invoice system 104, the forensics administrator device 108, and the forensics user device 110 are connected to the forensics analysis system 106. These connections may be direct or remote. For example, one or more of these connections may be through the Internet and/or one or more other networks. Additionally, the elements 102, 104, 108, 110, 106 of FIG. 1 may be connected to each other in ways other than is shown.

The forensics analysis system 106 includes a ticket/invoice data storage module 112, a forensics rules storage module 114, a forensics execution module 118, an anomaly storage module 120, and a case management storage module 122. The modules 112, 114, 118, 120, and 122 may correspond to cloud computing services programmed by computer readable instructions to perform as described herein. Each of the storage modules 112, 114, 120, and 122 includes one or more computer readable storage devices and in some examples, the storage modules 112, 114, 120, 122 share compute readable storage devices. In some implementations, the storage modules 112, 114, 120, 122 include one or more relational databases. The forensics execution module 118 includes one or more processors (e.g., central processor units) programmed to detect anomalies and to generate and transmit user interfaces to the devices 108 and 110. In some implementations, functions of the modules 112, 114, 118, 120, and 122 may be split into more modules or combined into fewer modules than illustrated.

In operation, the forensics analysis system receives ticket data 124 from the ticket system 102 and invoice data 126 from the invoice system 104. In some examples, the data 124, 126 is transmitted to the forensics analysis system 106 in response to one or more application programming interface (API) commands transmitted from the forensics analysis system 106 to the ticket system 102 and the invoice system 104. The ticket data 124 indicates one or more work tickets corresponding to work orders submitted by a company or other entity employing the forensics analysis system 106. For each work ticket, the ticket data 124 indicates a ticket identifier, a description of requested work, a date work was requested, a number of loads, a vendor identifier associated with the work ticket, an identifier of a vehicle operator associated with the work ticket, a number of hours worked, a service start date, a service end date, a vehicle identifier, other information, or a combination thereof. The invoice data 126 indicates one or more invoices received from one or more vendors. For each invoice, the invoice data 126 indicates a billed amount, a number of barrels, one or more line item amounts, a number of loads, an invoice identifier, an associated work ticket identifier, a description of requested work, a vendor identifier associated with the work ticket, an identifier of a vehicle operator associated with the work ticket, a number of hours worked, a service start date, a service end date, a vehicle identifier, other information, or a combination thereof. The forensics analysis system 106 stores the ticket data 124 and the invoice data 126 in the ticket/invoice data storage 112 module.

The forensics execution module 118 automatically compares the ticket data 124 and the invoice data 126 stored in the ticket/invoice data storage 112 to one or more forensics rules stored in the forensics rules storage module 114 to identify anomalies. The forensics execution module 118 may assign each identified anomaly a unique identifier. In some implementations, the forensics execution module 118 further identifies anomaly severity levels based on the comparisons.

Examples of forensics rules stored by the forensics rules storage module 114 in an oilfield services context include a "24 hour billing by driver," rule, a "missing driver tickets" rule, a "per barrel/load pricing" rule, a "phantom load" rule, a "24 hour billing by truck" rule, a "name game" rule, a "double billing" rule, a "department of transportation limits" rule, an "old tickets" rule, a "bill received from hauler for disposal at direct-billed disposal site" rule, a "zero hour line item" rule, a "multiple line items on tickets for hours" rule, a "truck time overlap" rule, and a "driver time overlap" rule.

The "24 hour billing by driver," rule specifies one or more threshold durations that a driver may drive within a 24 hour period. To apply the 24 hour billing by driver rule, the forensics execution module 118 determines how many hours each driver worked in each 24 hour period based on hours and dates reported for each driver in the invoice data 126 and/or the ticket data 124 and dates. In response to determining that the number of hours a driver worked exceeds a first threshold (e.g., 16 hours), the forensics execution module 118 generates an anomaly indicating the tickets and/or invoices associated with the driver. In response to determining that the number of hours the driver worked exceeds a second threshold (e.g., 18), the forensics execution module 118 stores an indication that the anomaly is moderate. In response to determining that the number of hours the driver worked exceeds a third threshold (e.g., 24), the forensics execution module 118 stores an indication that the anomaly is severe.

The "missing driver tickets," rule flags jumps in sequential numbering of tickets associated with a driver. To apply the "missing driver tickets" rule, the forensics execution module 118 generates an anomaly in response to determining tickets associated with a driver tickets within a threshold period (e.g., 16 hours) are not sequentially numbered. Tickets that are out of sequence may indicate that a driver is working for multiple vendors.

The "per barrel/load pricing," rule flags productivity of a vendor or driver that exceeds a volume threshold. To apply the "per barrel/load pricing" rule, the forensics execution module 118 generates an anomaly in response to determining a vendor or driver transported more than a threshold number of loads (e.g., 7) or barrels (e.g., 800) within a period of time (e.g., 1 day).

The "phantom load," rule flags instances in which sequential water station and disposal tickets are associated with the same driver and/or vehicle. Example disposal tickets include brine water tickets, produced water tickets, and fresh water tickets. To apply the "phantom load" rule, the forensics execution module 118 generates an anomaly in response to determining that two sequential tickets for a driver and/or vehicle are water station and disposal tickets. In response to determining that more than 2 sequential tickets for the driver and/or vehicle are water station and disposal tickets, the forensics execution module 118 stores an indication that the anomaly is severe.

The "24 hour billing by truck," rule specifies one or more threshold durations that a vehicle may drive within a 24 hour period. To apply the 24 hour billing by vehicle rule, the forensics execution module 118 determines how many hours each vehicle worked in each 24 hour period based on hours and dates reported for each vehicle in the invoice data 126 and/or the ticket data 124 and dates. In response to determining that the number of hours a vehicle worked exceeds a threshold (e.g., 24 hours), the forensics execution module 118 generates an anomaly indicating the tickets and/or invoices associated with the vehicle. The forensics execution module 118 may also store an indication that the anomaly is severe.

The "name game," rule flags instances in which a vehicle is operated more than a threshold period of time and changes drivers within a 24 hour period. To apply the "name game" rule, the forensics execution module 118 generates an anomaly in response to determining that a vehicle was operated more than a first threshold period (e.g., 16 hours) and that more than a threshold number of drivers (e.g., 1) operated the vehicle within a 24 hour period. In response to determining that the vehicle was operated more than a second threshold period (e.g., 20 hours) and that more than a threshold number of drivers (e.g., 1) operated the vehicle within the 24 hour period, the forensics execution module 118 stores an indication that the anomaly is severe.

The "double billing," rule flags instances in which an invoice is submitted twice under different invoice numbers. To apply the "double billing" rule, the forensics execution module 118 generates an anomaly in response to determining that two invoices indicate the same property serviced, indicate same line number amount, and indicate a same date of service. In response to determining that more than 2 invoices are the same, the forensics execution module 118 stores an indication that the anomaly is severe.

The "department of transportation limits," rule flags instances in which a driver exceeds department of transportation limits on driving in a week. To apply the "department of transportation limits" rule, the forensics execution module 118 generates an anomaly in response to determining that a driver has driven more than 70 hours in a week. The forensics execution module 118 may also store an indication that the anomaly is severe.

The "old tickets," rule flags instances in which a ticket is submitted long after a service date identified in the ticket. To apply the "old tickets" rule, the forensics execution module 118 generates an anomaly in response to determining that a ticket submission date is more than a threshold period of time (e.g., 60 days) after a service date identified by the ticket.

The "bill received from hauler for disposal at direct-billed disposal site," rule flags instances in which a vendor submits a ticket that has a monetary value greater than $0.00 for disposal at a site that directly bills. To apply the "bill received from hauler for disposal at direct-billed disposal site" rule, the forensics execution module 118 generates an anomaly in response to determining that a ticket is associated with a direct-billed disposal site.

The "zero hour line item," rule flags instances in which a vendor submits a ticket that includes a line item associated with zero hours of work. To apply the "bill received from hauler for disposal at direct-billed disposal site" rule, the forensics execution module 118 generates an anomaly in response to determining that a ticket includes a line item associated with zero hours of work.

The "multiple line items on tickets for hours," rule flags instances in which a vendor submits a ticket that includes multiple line items on a ticket for hours.

The "truck time overlap," rule flags instances in which a vehicle is indicated as being operated at a particular time by more than one ticket. To apply the "truck time overlap" rule, the forensics execution module 118 generates an anomaly in response to determining that start times and end times overlap for at least two tickets associated with a vehicle.

The "driver time overlap," rule flags instances in which a driver is indicated as working at a particular time by more than one ticket. To apply the "driver time overlap" rule, the forensics execution module 118 generates an anomaly in response to determining that start times and end times overlap for at least two tickets associated with a driver.

The forensics execution module 118 may apply any combination of the rules stored in the forensics rules storage 114 to the ticket data 124 and the invoice data 126. Further, in some implementations two or more of the rules described above are combined into a single rule.

Based on the comparisons of the ticket data 124 and the invoice data 126 to the forensics rules stored in the forensics rules storage 114, the forensics execution module 118 identifies one or more anomalies and stores indications of the one or more anomalies in the anomaly storage module 120. The forensics execution module 118 may further store an indication of severity for each identified anomaly. Data stored in the anomaly storage module 120 relates each identified anomaly to one or more corresponding tickets and/or invoices.

The forensics execution module 118 is configured to generate an anomaly dashboard 128 based on the anomaly data stored in the anomaly storage module 120 and to transmit the anomaly dashboard 128 to the forensics administrator device 108. The anomaly dashboard 128 corresponds to a user interface that displays information related to the identified anomalies stored in the anomaly storage module 120. Examples of information included in the anomaly dashboard 128 include vendor identifiers, a count of new anomalies associated with a vendor, a count of open anomalies associated with a vendor, a count of closed anomalies associated with a vendor, an amount of recovered money associated with a vendor, an amount of money subject to anomalies, a count of unique tickets associated with anomalies, a count of total tickets associated with a vendor, and a percentage of tickets associated with a vendor that are anomalous. The anomaly dashboard 128 further includes selectable options to assign identified anomalies to one or more user accounts for analysis. In some implementations, the forensics execution module 118 transmits the anomaly dashboard 128 to the forensics administrator device 108 in response to receiving an authenticated request to access an administrator user account associated with the forensics analysis system 106. In response to receiving an anomaly assignment 130 from the forensics administrator device 108, the forensics execution module 118 stores an indication of the anomaly assignment 130 in the case management storage module 122. The anomaly assignment 130 assigns a particular anomaly to one or more particular user accounts.

The forensics execution module 118 transmits a case dashboard 132 to a forensics user device 110 based on the anomaly assignment 130 stored in the case management storage 122. The case dashboard 132 may be sent to the forensics user device 110 in response to the forensics execution module 118 receiving an authenticated request to access one of the user accounts to which the anomaly assignment 130 refers from the forensics user device 110. The case dashboard 132 corresponds to a graphical user interface displaying information related to anomalies assigned to the user account accessing the forensics analysis system 106 via the forensics user device 110. Information related to the anomalies assigned to the user account may include an anomaly identifier, an anomaly, a vendor identifier associated with the anomaly, a vendor name associated with the anomaly, one or more ticket identifiers associated with the anomaly, one or more invoice identifiers associated with the anomaly, a status of the anomaly, notes associated with the anomaly, other information, or a combination thereof. The forensics user device 110 further includes selectable options to input case data. Case data may include notes, an indication that an anomaly has been resolved, or a combination thereof. The forensics execution module 118 is configured to update the case management storage module 122 based on case data received from the forensics user device 110. In the illustrated example, the forensics execution module 118 receives case data 134 from the forensics user device 110 and updates the case management storage module 122 accordingly.

Thus, FIG. 1 depicts a system that automatically performs forensic analysis of invoices and tickets to identify anomalies and that provides a platform to both assign anomalies for evaluation and receive updates regarding resolution of the identified anomalies. Accordingly, the system may prevent losses to a company caused by unscrupulous or human error.

Figure 2:
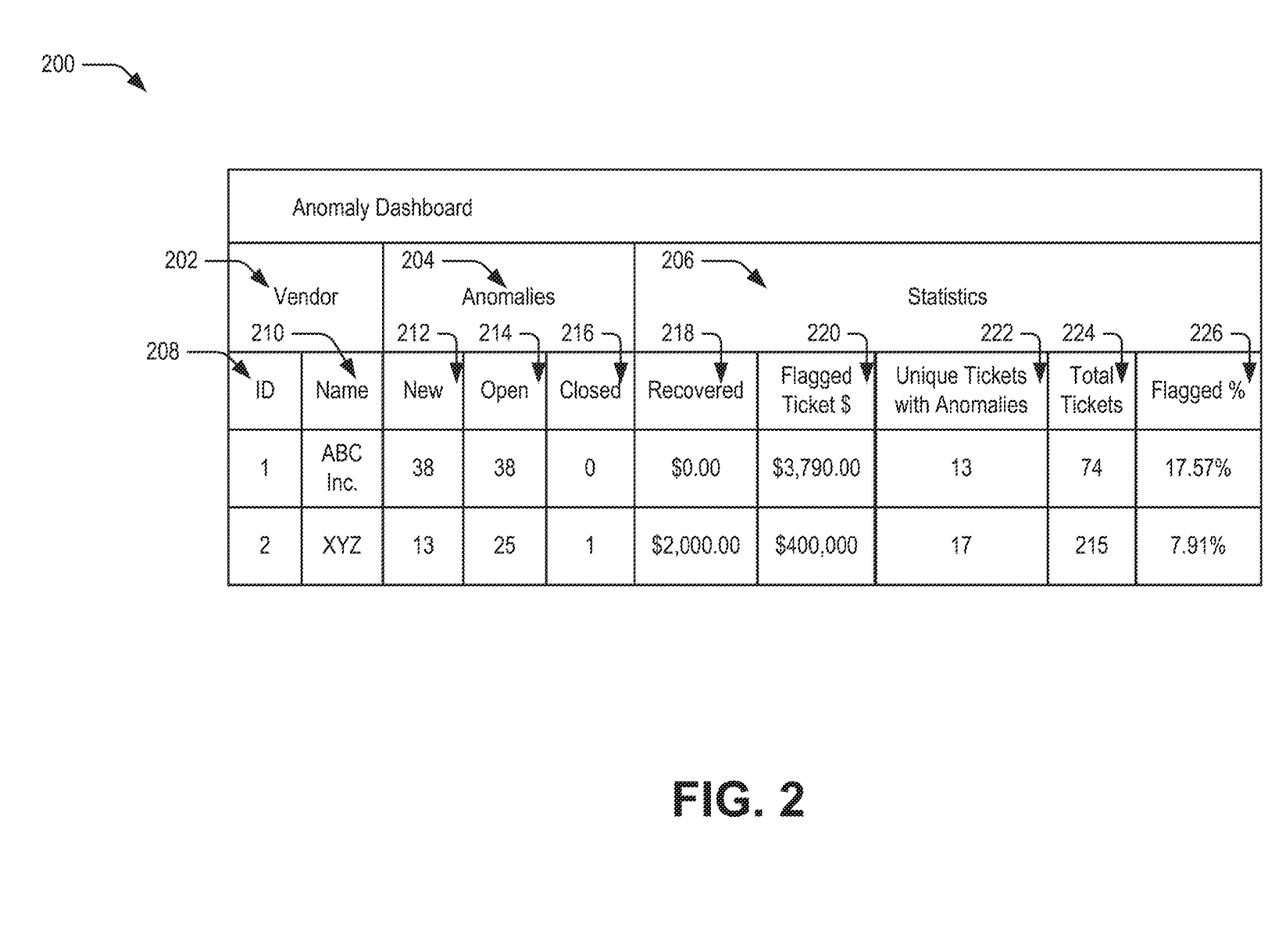
FIG. 2 illustrates an example of a screen of an anomaly dashboard.

FIG. 2 depicts an example of a screen 200 of an anomaly dashboard, such as the anomaly dashboard 128. In the illustrated example, the screen 200 of the anomaly dashboard displays various information organized by vendor. The information includes vendor information 202, anomaly information 204, and statistics information 206. The vendor information 202 includes a vendor identifier field 208 and a vendor name field 210. The vendor identifier field 208 includes a unique identifier associated with a vendor, and the vendor name field 210 includes a name associated with the vendor. The anomaly information 204 includes a new anomalies field 212, an open anomalies field 214, and a closed anomalies field 216. The new anomalies field 212 indicates a count of new anomalies for a vendor that have not been assigned to a user account for analysis. The open anomalies field 214 indicates a count of open anomalies for the vendor. The closed anomalies field 216 indicates a count of anomalies that have been resolved for the vendor. The statistics information 206 includes a recovered field 218, a flagged ticket price field 220, a unique tickets with anomalies field 222, a total tickets field 224, and a flagged ticket percentage 226. The recovered field 218 indicates an amount of money improperly charged by the vendor and recovered as a result of users of the forensics analysis system 106 recovering the money and/or preventing payment of the money. The flagged ticket price field 220 indicates a total value of tickets that have been flagged as anomalous. The unique tickets with anomalies field 222 indicates a count of unique tickets from the vendor that have been flagged as anomalous. The total tickets field 224 indicates a count of a total number of unique tickets from a vendor. The flagged ticket percentage field 226 indicates a percentage of tickets from a vendor that are flagged as including anomalies. In some implementations, the forensics execution module 118 is configured to generate an automated warning (e.g., a dialog box in the anomaly dashboard 128, a short messaging service message, an E-mail, or a combination thereof) in response to detecting a flagged ticket percentage for a vendor exceeding a threshold. In other implementations, the screen 200 may include different, less, or more information. Further, the screen 200 may include more, fewer, or different fields.

Elements of the screen 200 are selectable to generate additional screens including additional information. For example, in response to receiving a selection of the new anomalies field 212 for a particular vendor, the forensics execution module 118 may display a second screen showing the new anomalies for that vendor. The second screen may include selectable options to assign the new anomalies to user accounts. Further, the anomaly dashboard may include additional screens.

Figure 3:
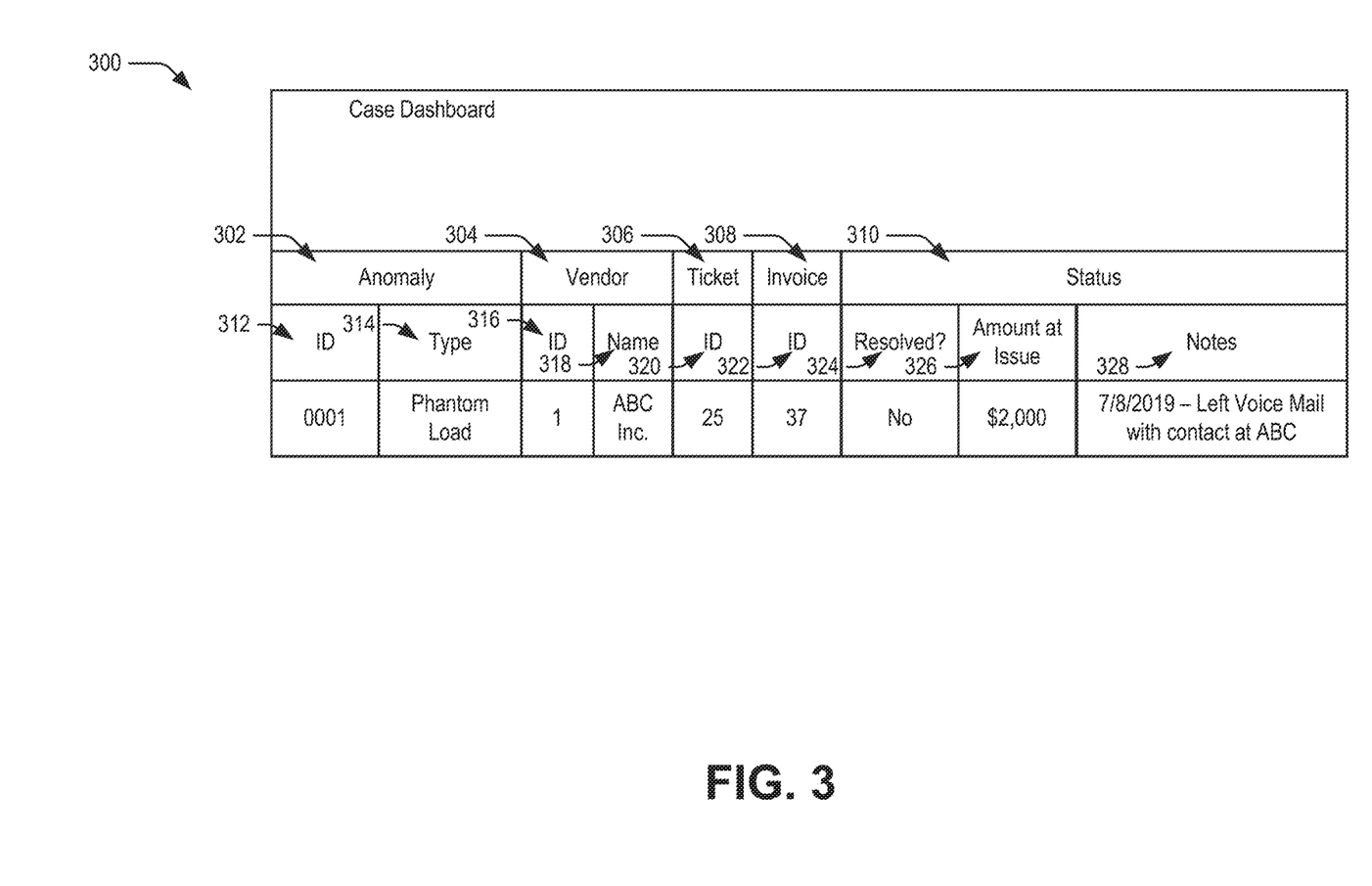
FIG. 3 illustrates an example of a screen of a case dashboard.

Referring to FIG. 3, a first screen 300 of a case dashboard, such as the case dashboard 132 is shown. In the illustrated example, the screen 300 of the case dashboard displays anomalies assigned to a user account for investigation. The screen 300 includes anomaly information 302, vendor information 304, ticket information 306, invoice information 308, and status information 310. The anomaly information 302 includes an anomaly identifier field 312 and a type field 314. The anomaly identifier field 312 indicates a unique identifier of an anomaly. The type field 314 indicates a type of the anomaly. The type may correspond to a rule included in the forensics rules storage module 114. The vendor information 304 includes a vendor identifier field 316 and a vendor name field 318. The vendor identifier field 316 indicates a unique identifier of a vendor associated with the anomaly and the vendor name field 318 indicates a name of the vendor. The ticket information 306 includes a ticket identifier field 320. The ticket identifier field 322 indicates one or more identifiers of one or more tickets associated with the anomaly. The invoice information 308 includes an invoice identifier field 322. The invoice identifier field 322 indicates one or more identifiers of one or more invoices associated with the anomaly. The status information 310 includes a resolved field 324, an amount at issue field 326, and a notes field 328. The resolved field 324 indicates whether a user account associated with the anomaly has marked the anomaly as resolved. The amount at issue field 326 indicates a total of the value of the invoices identified in the invoice ID field 322. The notes field 328 indicates notes input by the user account assigned to the anomaly. In other implementations, the screen 300 may include different, less, or more information. Further, the screen 300 may include more, fewer, or different fields.

Thus, FIGS. 2-3 illustrate various example screens that may be provided to users of a system for automatically performing forensic analysis of invoices and tickets to identify anomalies.

Figure 4:
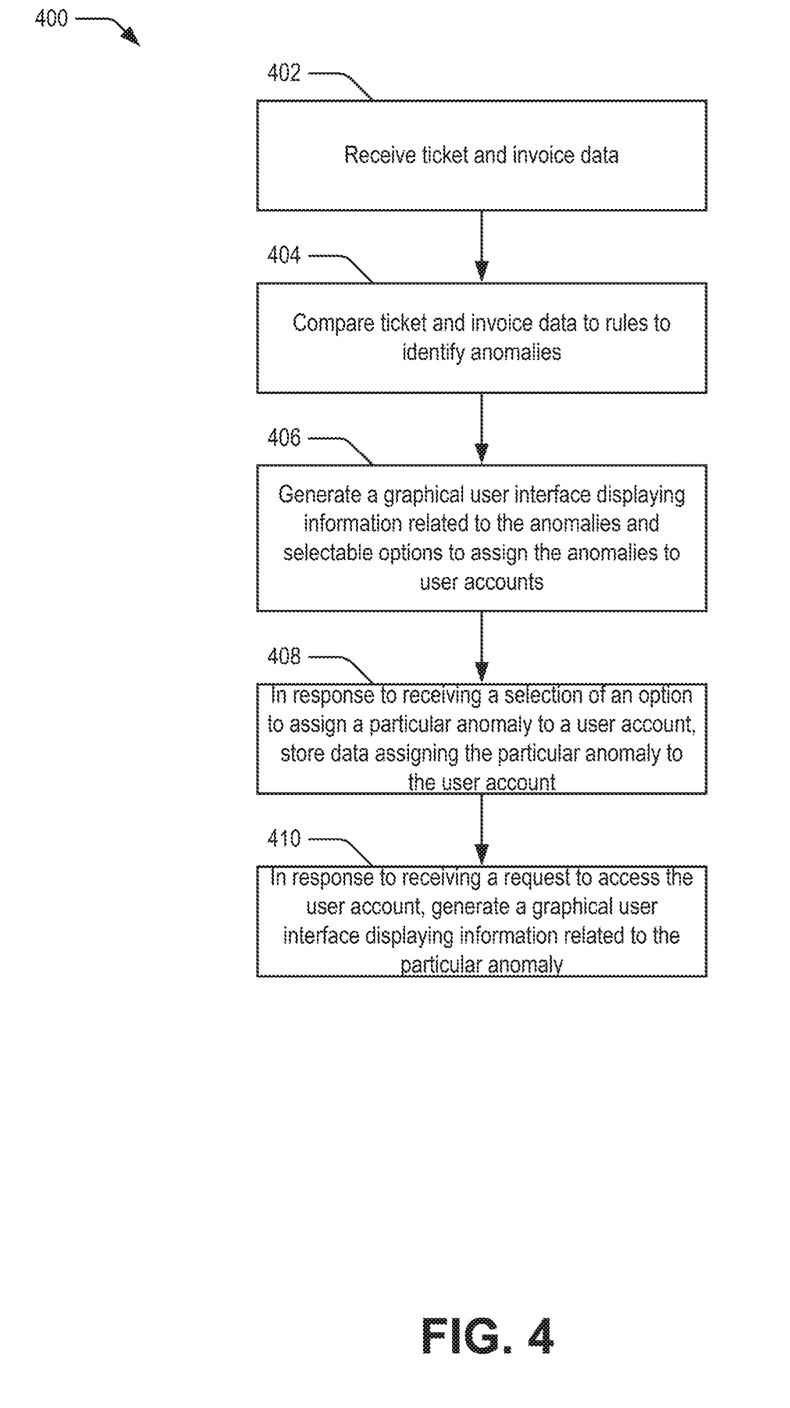
FIG. 4 illustrates an example of a method for analyzing ticketing and invoice data to identify anomalies.

Referring to FIG. 4, a flowchart illustrating a method 400 of automatically performing forensic analysis of invoices and tickets to identify anomalies is shown. The method 400 includes receiving ticket and invoice data, at 402. In an illustrative example, the forensics analysis system 106 receives the ticket data 124 and the invoice data 126 from the ticket system 102 and the invoice system 104.

The method 400 further includes comparing the ticket and invoice data to rules to identify anomalies, at 404. In an illustrative example, the forensics execution module 118 compares the ticket data and the invoice data 126 to the forensics rules stored in the forensics rules storage module 114 to identify anomalies.

The method 400 further includes generating a graphical user interface displaying information related to the anomalies and selectable options to assign the anomalies to user accounts, at 406. In an illustrative example, the forensics execution module 118 generates the anomaly dashboard 128 displaying anomalies detected in the ticket data 124 and/or the invoice data 126. The dashboard 128 further includes selectable options to assign the anomalies to user accounts.

The method 400 further includes, in response to receiving a selection of an option to assign a particular anomaly to a user account, storing data assigning the particular anomaly to the user account, at 408. In an illustrative example, the forensics execution module 118 stores data linking a particular anomaly to a user account in the case management storage module 122 in response to receiving the anomaly assignment 130 requesting that the particular anomaly be assigned to the user account.

The method 400 further includes, in response to receiving a request to access the user account, generating a graphical user interface displaying information related to the particular anomaly, at 410. In an illustrative example, the forensics execution module 118 stores generates the case dashboard 132 in response to receiving a request to access the user account from the forensics user device 110.

Thus, the method 400 illustrates a method for automatically performing forensic analysis of invoices and tickets to identify anomalies. Further, the method 400 provides a technique for providing an integrated platform for assigning and evaluating identified anomalies. Thus, the method 400 provides a new tool for forensic analysis that may be used to reduce overpayments and fraud.

Figure 5:
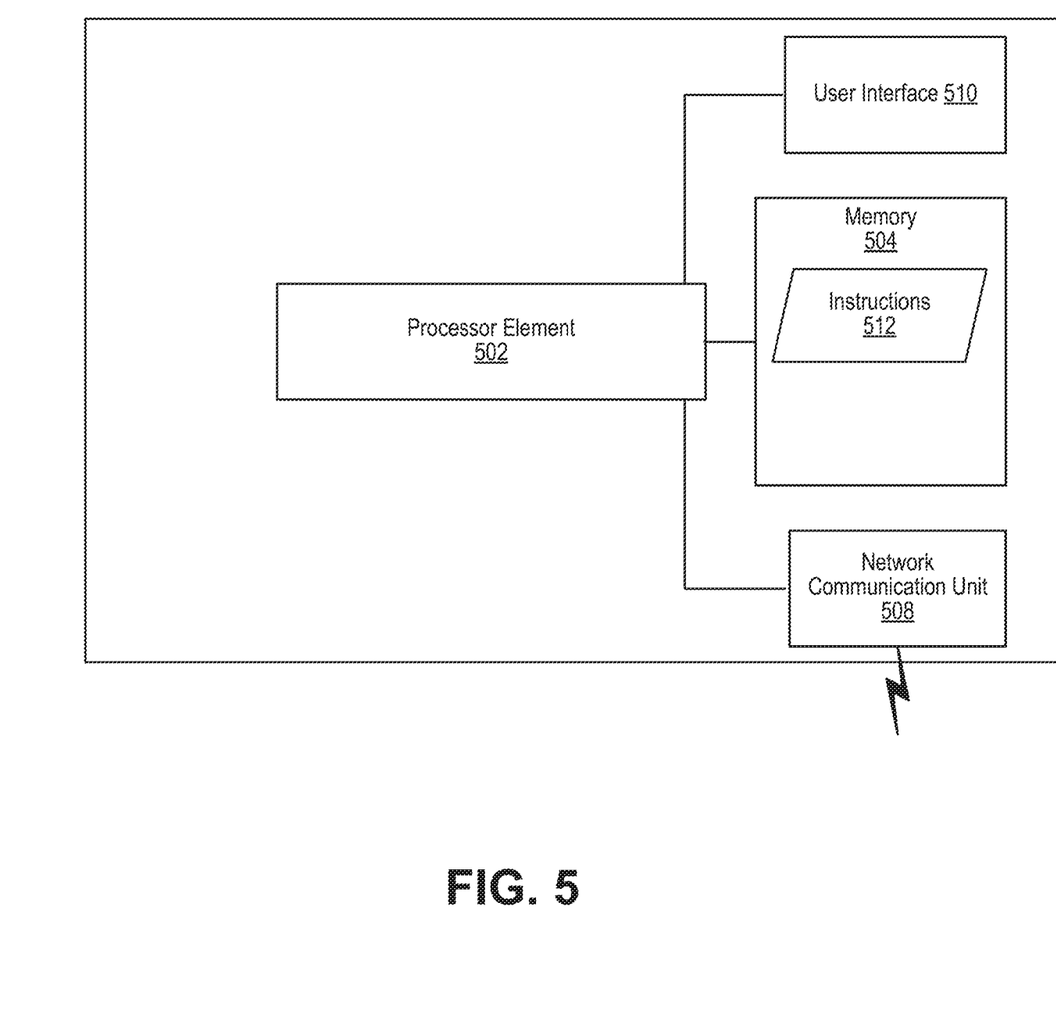
FIG. 5 illustrates an example of a computing device that may be used to analyze ticketing and invoice data to identify anomalies.

Referring now to FIG. 5, a block diagram illustrates a computing device 500 that is usable to implement the techniques described herein in accordance with one or more embodiments. For example, in some implementations, the computing device 500 corresponds the forensics analysis system 106, to the ticket system 102, to the invoice system 104, to the forensics administrator device 108, or to the forensics user device 110.

The computing device 500 includes a processor element 502 that contains one or more hardware processors, where each hardware processor has a single or multiple processor cores. In one embodiment, the processor element 502 includes at least one shared cache that stores data (e.g., computing instructions) that are utilized by one or more other components of processor element 502. In a particular example, the shared cache corresponds to locally cached data stored in a memory for faster access by components of the processor element 502. In one or more embodiments, the shared cache includes one or more mid-level caches, such as level 2 (L2), level 3 (L3), level 4 (L4), or other levels of cache, a last level cache (LLC), or combinations thereof. Examples of processors include, but are not limited to, a central processing unit (CPU), a microprocessor, and a digital signal processor (DSP), a graphics processing unit (GPU), an application specific integrated circuit (ASIC), and a field-programmable gate array (FPGA).

FIG. 5 illustrates that a memory 504 is operatively coupled to the processor element 502. In some embodiments, the memory 504 corresponds to a non-transitory medium configured to store various types of data. In an illustrative example, the memory 504 includes one or more memory devices that comprise a non-volatile storage device and/or volatile memory. Examples of non-volatile storage devices include disk drives, optical drives, solid-state drives (SSDs), tap drives, flash memory, read only memory (ROM), and/or any other type memory designed to maintain data for a duration time after a power loss or shut down operation. An example of volatile memory is random access memory (RAM). In the illustrated example, the memory 504 stores instructions 512. The instructions 512 are executable by the processor element 502 to perform one or more of the operations or methods described with respect to FIGS. 1-4.

Persons of ordinary skill in the art are aware that software programs may be developed, encoded, and compiled in a variety computing of languages for a variety software platforms and/or operating systems and subsequently loaded and executed by the processor element 502. In one embodiment, the compiling process of the software program transforms program code written in a programming language to another computer language such that the processor element 502 is able to execute the programming code. For example, the compiling process of the software program may generate an executable program that provides encoded instructions (e.g., machine code instructions) for processor element 502 to accomplish specific, non-generic, particular computing functions.

After the compiling process, the encoded instructions are then loaded as computer executable instructions or process steps to the processor element 502 from storage (e.g., the memory 504) and/or embedded within the processor element 502 (e.g., cache). The processor element 502 executes the stored instructions or process steps in order to perform operations or process steps to transform the computing device into a non-generic, particular, specially programmed machine or apparatus. Stored data, e.g., data stored by a storage device, can be accessed by the processor element 502 during the execution of computer executable instructions or process steps to instruct one or more components within the computing device 500.

As shown in FIG. 5, the computing device 500 includes one or more input/output devices, such as a network communication unit 508 that could include a wired communication component and/or a wireless communications component, coupled to processor element 502. The network communication unit 508 corresponds to one or more transceiver unit(s) that utilize one or more of a variety of standardized network protocols, such as Wi-Fi, Ethernet, transmission control protocol/Internet Protocol (TCP/IP), etc., to effect communications between devices.

In the example of FIG. 5, the computing device 500 further includes a user interface 510 that may include a display, positional input device (such as a mouse, touchpad, touchscreen, or the like), keyboard, or other forms of user input and output devices. The user interface 510 can be coupled to processor element 502. Other output devices that permit a user to program or otherwise use the computing device can be provided in addition to or as an alternative to network communication unit 508. When the output device is or includes a display, the display can be implemented in various ways, including by a liquid crystal display (LCD) or a cathode-ray tube (CRT) or light emitting diode (LED) display, such as an organic LED (OLED) display. Some implementations of the computing device do not include the user interface 510.

It should be noted that in some examples, various components described herein may include more than one computing device, such as the computing device 500. For example, the forensics analytic system 106 may include a plurality of computing devices in a cloud computing architecture.

The various embodiments described above are provided by way of illustration only and should not be construed so as to limit the scope of the disclosure. Various modifications and changes can be made to the principles and embodiments described herein without departing from the scope of the disclosure and without departing from the claims which follow.

What is claimed is:

1. A computer-implemented method, comprising:
    receiving, with a computing system that comprises one or more hardware processors, ticket and invoice data, the ticket data comprising a ticket identifier, a description of requested work, a date work was requested, a number of loads, a vendor identifier associated with the work ticket, an identifier of a vehicle operator associated with the work ticket, a number of hours worked, a service start date, a service end date, and a vehicle identifier;
    comparing, with the computing system, the ticket and invoice data to rules to identify anomalies, each anomaly comprising a determination that the invoice data exceeds a threshold of at least one rule of the rules, with at least two rules combined into a single rule;
    generating, with the computing system, a graphical user interface displaying information related to the anomalies and selectable options to assign the anomalies to user accounts;
    in response to receiving a selection of an option to assign a particular anomaly to a user account, storing, with the computing system, data assigning the particular anomaly to the user account; and
    in response to receiving a request to access the user account, generating, with the computing system, a graphical user interface displaying information related to the particular anomaly.

2. The computer-implemented method of claim 1, further comprising transmitting, with the computing system, the graphical user interface displaying the information related to the particular anomaly to a device associated with the user account.

3. The computer-implemented method of claim 2, further comprising:
    receiving, with the computing system, notes associated with the particular anomaly from the device associated with the user account; and
    storing, with the computing system, an association of the notes to the anomaly.

4. The computer-implemented method of claim 1, further comprising transmitting, with the computing system, the graphical user interface displaying the information related to the anomalies and the selectable options to assign the anomalies to user accounts to a device associated with an administrator account.

5. The computer-implemented method of claim 1, wherein the ticket and invoice data describe oilfield services.

6. The computer-implemented method of claim 1, wherein comparing the ticket and invoice data to the rules to identify anomalies includes determining, with the computing system, whether the ticket and invoice data indicates that hours a driver worked in a 24 hour period exceed a threshold.

7. The computer-implemented method of claim 1, wherein comparing the ticket and invoice data to the rules to identify anomalies includes determining, with the computing system, whether the ticket and invoice data indicates that hours a vehicle was used in a 24 hour period exceed a threshold.

8. The computer-implemented method of claim 1, wherein comparing the ticket and invoice data to the rules to identify anomalies includes determining, with the computing system, whether tickets associated with a driver in a threshold period of time are sequentially numbered.

9. The computer-implemented method of claim 1, wherein comparing the ticket and invoice data to the rules to identify anomalies includes determining, with the computing system, whether the ticket and invoice data indicates that a vendor transported more than a threshold volume of oilfield fluids.

10. The computer-implemented method of claim 1, wherein comparing the ticket and invoice data to the rules to identify anomalies includes determining, with the computing system, whether the ticket and invoice data indicates that a driver or vehicle visited water stations and disposal stations sequentially.

11. The computer-implemented method of claim 1, further comprising determining, with the computing system, severity levels of the anomalies by comparing the ticket and invoice data to the rules.

12. The computer-implemented method of claim 1, wherein comparing the ticket and invoice data to the rules to identify anomalies includes determining, with the computing system, whether the ticket and invoice data indicates that a vehicle was operated by more than one driver and for more than a threshold duration in a 24 hour period.

13. The computer-implemented method of claim 1, wherein comparing the ticket and invoice data to the rules to identify anomalies includes determining, with the computing system, whether invoices with different invoice identifiers identify a common line number amount, date of service, and property serviced.

14. The computer-implemented method of claim 1, wherein comparing the ticket and invoice data to the rules to identify anomalies includes determining, with the computing system, whether the ticket and invoice data indicates that a driver worked more than 70 hours in a week.

15. The computer-implemented method of claim 1, wherein comparing the ticket and invoice data to the rules to identify anomalies includes determining, with the computing system, whether the ticket and invoice data indicates that a ticket was submitted more than a threshold period of time after a service date identified by the ticket.

16. The computer-implemented method of claim 1, wherein comparing the ticket and invoice data to the rules to identify anomalies includes at least one of:
   determining, with the computing system, whether a ticket includes a charge for disposal at a disposal site associated with a direct billing procedure;
   determining, with the computing system, whether the ticket includes a line item associated with zero hours of work;
   determining, with the computing system, whether a first period of time that the ticket indicates a vehicle was in use overlaps with a second period of time that another ticket indicates the vehicle was in use; or
   determining, with the computing system, whether a third period of time that the ticket indicates a driver was working overlaps a fourth period of time that the other ticket indicates the driver was working.

17. An apparatus comprising a tangible, non-transitory computer readable storage device configured to store instructions executable by a processor to:
   receive ticket and invoice data, the ticket data comprising a ticket identifier, a description of requested work, a date work was requested, a number of loads, a vendor identifier associated with the work ticket, an identifier of a vehicle operator associated with the work ticket, a number of hours worked, a service start date, a service end date, and a vehicle identifier;
   compare the ticket and invoice data to rules to identify anomalies, each anomaly comprising a determination that the invoice data exceeds a threshold of at least one rule of the rules, with at least two rules combined into a single rule;
   generate a graphical user interface displaying information related to the anomalies and selectable options to assign the anomalies to user accounts;
   in response to receiving a selection of an option to assign a particular anomaly to a user account, store data assigning the particular anomaly to the user account; and
   in response to receiving a request to access the user account, generate a graphical user interface displaying information related to the particular anomaly.

18. The apparatus of claim 17, wherein the instructions are further executable by the processor to initiate transmission of the graphical user interface displaying the information related to the particular anomaly to a device associated with the user account.

19. The apparatus of claim 18, wherein the instructions are further executable by the processor to:
   receive notes associated with the particular anomaly from the device associated with the user account; and
   store an association of the notes to the anomaly.

20. The apparatus of claim 17, wherein the instructions are further executable by the processor to initiate transmission of the graphical user interface displaying the information related to the anomalies and the selectable options to assign the anomalies to user accounts to a device associated with an administrator account.

21. The computer-implemented method of claim 1, wherein the invoice data comprises a billed amount, a number of barrels, one or more line item amounts, a number of loads, an invoice identifier, an associated work ticket identifier, a description of requested work, a vendor identifier associated with the work ticket, an identifier of a vehicle operator associated with the work ticket, a number of hours worked, a service start date, a service end date, and a vehicle identifier.

* * * * *